(12) United States Patent
Takagi

(10) Patent No.: US 12,077,403 B2
(45) Date of Patent: Sep. 3, 2024

(54) ROTATING DEVICE AND IMAGE FORMING APPARATUS

(71) Applicant: Hiroaki Takagi, Kanagawa (JP)

(72) Inventor: Hiroaki Takagi, Kanagawa (JP)

(73) Assignee: Ricoh Company, LTD., Toykyo (JP)

( * ) Notice: Subject to any disclaimer, the term of this patent is extended or adjusted under 35 U.S.C. 154(b) by 898 days.

(21) Appl. No.: 17/124,920

(22) Filed: Dec. 17, 2020

(65) Prior Publication Data

US 2021/0188578 A1    Jun. 24, 2021

(30) Foreign Application Priority Data

Dec. 20, 2019   (JP) ................................ 2019-230260

(51) Int. Cl.
*B65H 5/06* (2006.01)
*F16H 55/36* (2006.01)

(52) U.S. Cl.
CPC ........... *B65H 5/06* (2013.01); *B65H 2402/52* (2013.01); *B65H 2404/16* (2013.01); *B65H 2404/17* (2013.01); *F16H 55/36* (2013.01)

(58) Field of Classification Search
CPC .. B65H 2404/17; B65H 2402/52; B65H 5/06; F16C 13/02; F16C 35/067
See application file for complete search history.

(56) References Cited

U.S. PATENT DOCUMENTS 5,865,290 A * 2/1999 Scott ....................... F16C 19/56
                                                          193/37
8,789,829 B2 * 7/2014 Kawamata ............... B65H 5/06
                                                          347/108

FOREIGN PATENT DOCUMENTS

| JP | 63-005186 | 1/1988 |
|---|---|---|
| JP | H0741116 | 7/1995 |
| JP | H10184854 A | 7/1998 |
| JP | H11002313 A | 1/1999 |
| JP | 2001-125374 | 5/2001 |
| JP | 2003345177 A | 12/2003 |
| JP | 2006170392 A | 6/2006 |
| JP | 2011-21668 A | 2/2011 |
| JP | 2013-044332 | 3/2013 |

(Continued)

OTHER PUBLICATIONS

Japanese Office Action, dated Jul. 7, 2023, issued in corresponding Japanese Patent Application No. 2019-230260.

(Continued)

*Primary Examiner* — Jeremy R Severson
(74) *Attorney, Agent, or Firm* — Harness, Dickey & Pierce, P.L.C

(57) ABSTRACT

A rotating device includes a shaft member, a counterpart member, a bearing, and a retaining member. The counterpart member includes a shaft insertion portion into which the shaft member is inserted. The bearing is disposed in the shaft insertion portion and interposed between the counterpart member and the shaft member. The bearing causes the counterpart member and the shaft member to be rotatable relative to each other. The retaining member is disposed on an end portion of the shaft member on one side in an axial direction of the shaft member. The counterpart member includes an opposing portion closer to the end portion of the shaft member on the one side in the axial direction than the bearing. The opposing portion faces the retaining member in the axial direction.

20 Claims, 10 Drawing Sheets

(56) References Cited

FOREIGN PATENT DOCUMENTS

| | | |
|---|---|---|
| JP | 2013-054170 | 3/2013 |
| JP | 2014-100769 | 6/2014 |

OTHER PUBLICATIONS

Japanese Office Action, dated Dec. 8, 2023, issued in corresponding Japanese Patent Application No. 2019-230260.

* cited by examiner

ROTATING DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2019-230260, filed on Dec. 20, 2019, in the Japan Patent Office, the entire disclosure of which is hereby incorporated by reference herein.

BACKGROUND

Technical Field

Embodiments of the present disclosure relate to a rotating device and an image forming apparatus including the rotating device.

Related Art

There has been known a rotating device including a shaft member, a counterpart member having a shaft insertion portion into which the shaft member is inserted, a bearing interposed between the counterpart member and the shaft member and provided in the shaft insertion portion so that the counterpart member and the shaft member is rotatable relative to each other, and a retaining member attached to an end portion on one side of the shaft member in an axial direction of the shaft member.

SUMMARY

According to an aspect of the present disclosure, there is provided a rotating device that includes a shaft member, a counterpart member, a bearing, and a retaining member. The counterpart member includes a shaft insertion portion into which the shaft member is inserted. The bearing is disposed in the shaft insertion portion and interposed between the counterpart member and the shaft member. The bearing causes the counterpart member and the shaft member to be rotatable relative to each other. The retaining member is disposed on an end portion of the shaft member on one side in an axial direction of the shaft member. The counterpart member includes an opposing portion closer to the end portion of the shaft member on the one side in the axial direction than the bearing. The opposing portion faces the retaining member in the axial direction.

According to another aspect of the present disclosure, there is provided an image forming apparatus that includes the rotating device and an image forming device configured to form an image on a sheet.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
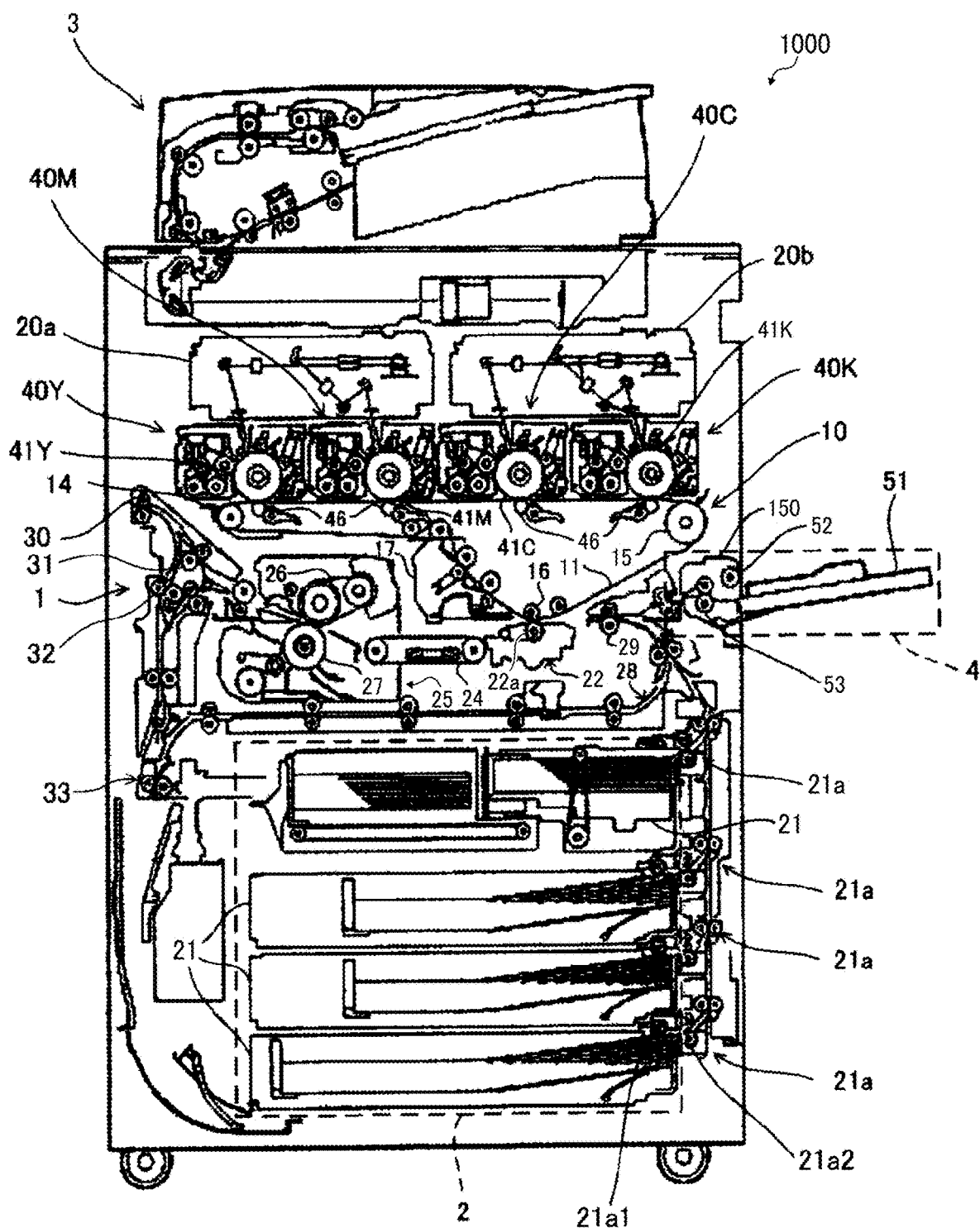
FIG. 1 is a schematic diagram illustrating an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A description is given hereinafter of an image forming apparatus 1000 according to an embodiment of the present disclosure. In the following embodiment, the image forming apparatus is described as a copier. However, an image forming apparatus according to an embodiment of the present disclosure is not limited to the copier and may be any other type of image forming apparatus. First, a description is given of the outline of the image forming apparatus 1000, with reference to FIG. 1. The image forming apparatus 1000 has the function as a digital color copier that digitizes image data obtained by scanning and reading an original document, and uses the image data to form an image. Further, the image forming apparatus 1000 also has the function of a facsimile machine that sends and receives image data of an original document to/from a remote place, and the function of what is called a printer that prints, on a paper sheet, image data handled by a computer.

In FIG. 1, the image forming apparatus 1000 forms an image on a recording sheet in an intermediate transfer system using an intermediate transfer belt 11, and is a tandem-type electrophotographic apparatus that forms a toner image of each color with its dedicated process cartridge. A multistage sheet feeding device 2 is provided in the lowermost part of the image forming apparatus 1000 in the vertical direction. Moreover, an image forming device 1 is provided above the sheet feeding device 2, and a scanner 3 is provided further above the image forming device 1. At each stage, the sheet feeding device 2 includes a sheet feed tray 21 and a sheet feed unit 21*a*. The sheet feed tray 21 contains a sheet bundle including recording sheets such as plain paper, overhead projector (OHP) film sheet, or traced drawings. The sheet feed unit 21*a* feeds a sheet of the sheet bundle contained in the sheet feed tray 21. The sheet feed unit 21*a* includes a pickup roller 21*a*1 and a sheet separation and conveyance unit 21*a*2. The pickup roller 21*a*1 picks up and feeds a recording sheet from the sheet feed tray 21. The sheet separation and conveyance unit 21*a*2 separates and conveys the recording sheet fed by the pickup roller 21*a*1.

A transfer device 10 is arranged substantially in the middle of the image forming device 1. In the transfer device 10, multiple rollers are arranged inside an endless loop of the intermediate transfer belt 11 so that the intermediate transfer belt 11 is stretched around the multiple rollers. The intermediate transfer belt 11 rotates (the surface of the intermediate transfer belt 11 moves) in a clockwise direction in FIG. 1. Four process cartridges 40Y, 40M, 40C, and 40K that form toner images in yellow, magenta, cyan, and black are arranged above the intermediate transfer belt 11 along a direction of movement of the surface of the intermediate transfer belt 11. Since the configurations of the four process cartridges 40Y, 40M, 40C, and 40K, each functioning as an image forming device, are identical to each other except for the color of toner, the suffixes "Y", "M", "C", and "K" indicating respective colors may be omitted below as appropriate. Moreover, two optical writing units are provided above the four process cartridges 40Y, 40M, 40C, and 40K. The two optical writing units are a first writing unit 20*a* and a second writing unit 20*b*, each functioning as a latent image writing unit.

The process cartridges 40Y, 40M, 40C, and 40K, respectively, include drum-shaped photoconductors 41Y, 41M, 41C, and 41K that function as latent image bearers. Each of the photoconductors 41Y, 41M, 41C, and 41K, which may be collectively referred to as the photoconductors 41 unless colors distinguished, is rotatable in a counterclockwise direction in FIG. 1. A charging device, a developing device, a photoconductor cleaning device, and a lubricant application device are provided around the photoconductor 41.

In FIG. 1, the transfer device 10 includes the intermediate transfer belt 11, a belt cleaning device 17, and four primary transfer rollers 46. A plurality of rollers including a tension roller 14, a drive roller 15, and a secondary transfer counter roller 16 stretch the intermediate transfer belt 11 with tension. A belt drive motor drives the drive roller 15 to rotate to endlessly move the intermediate transfer belt 11 in the clockwise direction in FIG. 1.

The four primary transfer rollers 46 are arranged to respectively contact an inner circumferential surface side of the intermediate transfer belt 11. A power supply applies a primary transfer bias to the primary transfer rollers 46. Moreover, the primary transfer rollers 46 presses the intermediate transfer belt 11 from the inner circumferential surface of the intermediate transfer belt 11 toward the photoconductors 41 to form respective primary transfer nips. The primary transfer roller 46 forms a primary transfer electric field between the photoconductor 41 and the primary transfer roller 46 at each primary transfer nip by the primary transfer bias. The primary transfer roller 46 primarily transfers a toner image on the photoconductor 41 onto the intermediate transfer belt 11 under the influence of the primary transfer electric field and the nip pressure.

Moreover, the transfer device 10 includes a secondary transfer unit 22. The secondary transfer unit 22 is disposed below the intermediate transfer belt 11 and serves as a secondary transfer device. The secondary transfer unit 22 includes a secondary transfer roller 22*a* that contacts and presses the secondary transfer counter roller 16 via the intermediate transfer belt 11. The secondary transfer roller 22*a* secondarily transfers toner images on the intermediate transfer belt 11 collectively onto a recording sheet conveyed to a secondary transfer nip region between the secondary transfer roller 22*a* and the intermediate transfer belt 11. A belt cleaning device 17 is provided downstream from the secondary transfer counter roller 16 in the direction of movement of the surface of the intermediate transfer belt 11. The belt cleaning device 17 removes residual toner remaining on the surface of the intermediate transfer belt 11 after image transfer. The belt cleaning device 17 further includes a lubricant applying mechanism. The lubricant applying mechanism applies lubricant to the surface of the intermediate transfer belt 11.

A fixing device 25 is provided downstream from the secondary transfer roller 22*a* in a direction of conveyance of the recording sheet. The fixing device 25 fixes the toner image formed on the recording sheet, to the surface of the recording sheet. An endless fixing belt 26 is pressed against a fixing pressure roller 27. An endless conveyance belt 24 is disposed between the secondary transfer unit 22 and the fixing device 25. The endless conveyance belt 24 is stretched between a pair of rollers. The conveyance belt 24 conveys the recording sheet, on which the image has been transferred, to the fixing device 25. Further, below the secondary transfer roller 22*a*, a reverse conveyance device 28 is provided that conveys a sheet reversed when images are formed on both sides of the sheet.

A bypass sheet feeding device 4 is disposed on the right side of the image forming device 1 in FIG. 1. Furthermore, the bypass sheet feeding device 4 includes a bypass tray 51 and a bypass sheet feeding device 150. The bypass tray 51 loads a recording sheet to be fed by a bypass sheet feeding operation. The bypass sheet feeding device 150 feeds the recording sheet loaded on the bypass tray 51. The bypass sheet feeding device 150 includes a bypass pickup roller 52 and a bypass separation and conveyance unit 53. The bypass pickup roller 52 picks up and feeds a recording sheet from the bypass tray 51. The bypass separation and conveyance unit 53 separates and conveys the sheet fed from the bypass tray 51.

When a color original document is copied with the image forming apparatus 1000 including the above-described configurations, the scanner 3 reads an image of the color original document placed on an exposure glass. Moreover, the intermediate transfer belt 11 is rotated to form a toner image on each photoconductor 41 by image forming processes of the image forming apparatus 1000. Then, the toner images formed on the photoconductors 41Y, 41M. 41C, and 41K are sequentially overlaid to be primarily transferred onto the intermediate transfer belt 11. Accordingly, a four-color composite toner image is formed on the intermediate transfer belt 11.

In parallel with the image forming operations of the four-color composite toner images being transferred onto the intermediate transfer belt 11, the sheet feed unit 21a separates and feeds recording sheets one by one from a selected one of the sheet feed trays 21 of the sheet feeding device 2, and conveys the recording sheets toward a pair of registration rollers 29.

Instead of feeding recording sheets from the sheet feed tray 21, a recording sheet may be fed and conveyed by the bypass tray 51. In this case, the recording sheets on the bypass tray 51 are separated and fed one by one from the bypass sheet feeding device 150, toward the pair of registration roller 29.

When the separated and conveyed recording sheet is brought into contact with a nip between the pair of registration rollers 29, the pair of registration rollers 29 temporarily stop the conveyance of the separated and conveyed recording sheet and cause the recording sheet to stand by. The pair of registration rollers 29 resumes the rotation at a proper timing in such a manner as to set the positional relationship between the four-color composite toner image overlaid on the intermediate transfer belt 11 and a leading end of the recording sheet, to a given position. The pair of registration rollers 29 is rotated to convey the standby recording sheet again. The secondary transfer roller 22a secondarily transfers the four-color composite toner image on the intermediate transfer belt 11, to the given position of the recording sheet. Thus, a full color toner image is formed on the recording sheet.

The conveyance belt 24 conveys the recording sheet on which the full-color toner image is formed in such a way to the fixing device 25 located downstream from the secondary transfer roller 22a in the conveyance path. The fixing device 25 fixes the full color toner image that has been secondarily transferred by the secondary transfer roller 22a, to the recording sheet.

In a face-up mode in which the recording sheet is ejected with the surface on which the image is formed facing upward, the recording sheet on which the full-color toner image is fixed is conveyed by a pair of pre-ejection rollers 31, and is discharged to the outside of the image forming apparatus 1000 by the pair of ejection rollers 30. On the other hand, in a face-down mode in which the recording sheet is ejected with the surface on which the image is formed facing down, the recording sheet on which the full-color toner image is fixed is conveyed to a switchback conveyance device 33. The switchback conveyance device 33 conveys the recording sheet in a switchback manner toward the pair of switchback pre-ejection rollers 32, and the pair of switchback pre-ejection rollers 32 conveys the recording sheet toward the pair of ejection rollers 30. The pair of ejection rollers 30 discharges the recording sheet to the outside of the image forming apparatus 1000.

In a duplex printing mode of forming images on both sides of a recording sheet, when the recording sheet having the full-color toner image fixed on the first side is ejected from the fixing device 25, the recording sheet is conveyed to the switchback conveyance device 33 instead of being conveyed to the pair of ejection rollers 30. The switchback conveyance device 33 performs switchback conveyance of the recording sheet, reverses the recording sheet, and conveys the recording sheet to the reverse conveyance device 28. The reverse conveyance device 28 re-conveys the recording sheet to the pair of registration rollers 29. Thereafter, the image forming apparatus 1000 causes the recording sheet to pass through the secondary transfer roller 22a and the fixing device 25 to form a full-color image also on the second side of the recording sheet.

Figure 2:
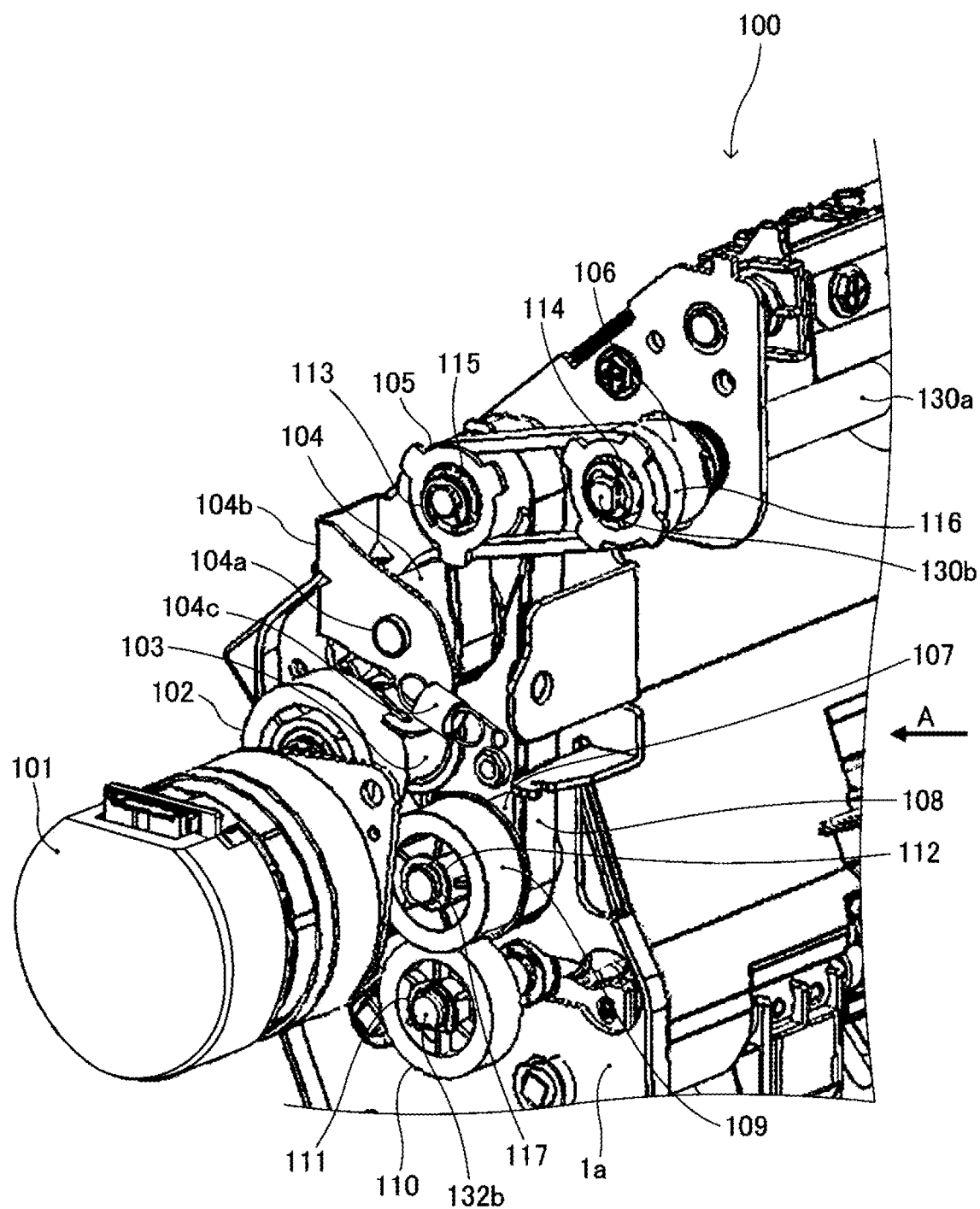
FIG. 2 is a schematic perspective view of a sheet-ejection drive device.
Figure 3:
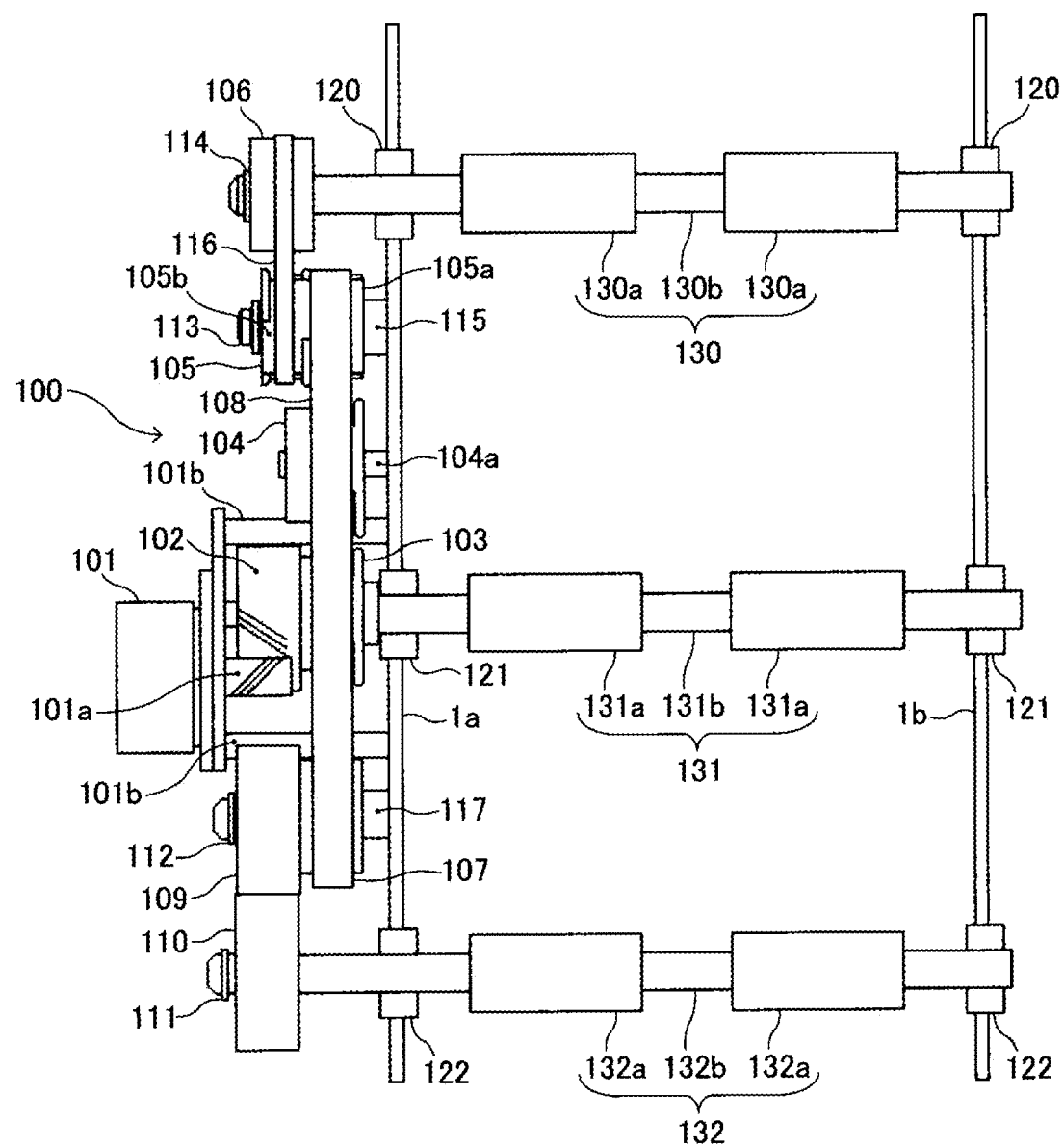
FIG. 3 is a schematic configuration diagram of the sheet-ejection drive device viewed from a direction indicated by arrow A in FIG. 2.

FIG. 2 is a schematic perspective view of the sheet-ejection drive device 100 as a rotating device that drives the pair of ejection rollers 30, the pair of pre-ejection rollers 31, and the pair of switchback pre-ejection rollers 32. FIG. 3 is a schematic configuration diagram of the sheet-ejection drive device 100 viewed from the direction indicated by arrow A in FIG. 2. In FIG. 3, the arrangement of members is slightly different from the arrangement of members in FIG. 2 in order to facilitate understanding of the members of the sheet-ejection drive device 100.

The drive roller 130 for the pair of ejection rollers 30 includes two roller portions 130a and a roller shaft 130b. The two roller portions 130a are fixed to the roller shaft 130b at a predetermined interval in the axial direction of the roller shaft 130b. A drive roller 131 for the pair of pre-ejection rollers 31 has the same configuration as the drive roller 130 for the pair of ejection rollers 30. In other words, the drive roller 131 includes two roller portions 131a and a roller shaft 131b. A drive roller 132 for the pair of switchback pre-ejection rollers 32 also has a similar configuration and includes two roller portions 132a and a roller shaft 132b. A front plate 1b and a rear plate 1a support roller shafts 130b, 131b, and 132b, respectively, of the drive rollers 130, 131, and 132 via bearings 120, 121, and 122.

The sheet-ejection drive device 100 is disposed on the rear side of the image forming apparatus 1000, which is one side in the axial direction, and includes a sheet ejection motor 101 as a drive source. The sheet ejection motor 101 is attached to the real plate 1a of the image forming apparatus 1000 via studs 101b. The sheet-ejection drive device 100 includes a reduction gear 102 that meshes with a motor gear 101a of the sheet ejection motor 101. The reduction gear 102 is fixed to a rear end portion of the roller shaft 131b of the drive roller 131 for the pair of switchback pre-ejection rollers 32.

The sheet-ejection drive device 100 includes a first timing belt 108. The first timing belt 108 is wound around a drive pulley 103, an input pulley portion 105a of a first relay pulley 105, and a second relay pulley 107. The sheet-ejection drive device 100 includes a tightener roller 104. The tightener roller 104 is in contact with the outer circumferential surface of the first timing belt 108 to apply tension to the first timing belt 108.

The tightener roller 104 is rotatably supported by a tightener support shaft 104a fixed to the rear plate 1a. The tightener support shaft 104a is supported by the tightener holder 104b. The tightener holder 104b is held by the rear plate 1a so that the tightener roller 104 is movable in directions in which the tightener roller 104 comes into contact with and separates from the first timing belt 108. The tightener holder 104b is biased toward the first timing belt 108 by a spring 104c as a biasing member. The spring 104c biases the tightener holder 104b toward the first timing belt 108, so that the tightener roller 104 applies a predetermined tension to the first timing belt 108.

The drive pulley 103 is fixed to a roller shaft 131b of the drive roller 131 for the pair of pre-ejection rollers 31. The first relay pulley 105 is rotatably supported by a first support shaft 115 fixed to the rear plate 1a. The first relay pulley 105 includes an input pulley portion 105a and an output pulley portion 105b. The first timing belt 108 is wound around the input pulley portion 105a. The second timing belt 116 is wound around the output pulley portion 105b. An E ring 113 serving as a retaining member is attached to a distal end portion of the first support shaft 115. Attaching the E ring 113 to the distal end portion of the first support shaft 115 can prevent the first relay pulley 105 from coming off the first support shaft 115.

The second timing belt 116 is narrower than the first timing belt 108. The second timing belt 116 is wound around the first relay pulley 105 and an ejection output pulley 106. The ejection output pulley 106 is fixed to the rear end portion of the roller shaft 130b of the drive roller 130 for the pair of ejection rollers 30. An E ring 114 serving as a retaining member is fixed to the rear end portion of the roller shaft 130b of the drive roller 130 for the sheet pair of ejection rollers 30. The E ring 114 prevents the ejection output pulley 106 from coming off the roller shaft 130b.

The second relay pulley 107 around which the first timing belt 108 is wound is rotatably supported by a second support shaft 117 fixed to the rear plate 1a. The second relay pulley 107 is an integrally molded product of resin and a relay gear 109 that meshes with an ejection output gear 110. An E ring 112 serving as a retaining member is attached to a distal end of the second support shaft 117. The E ring 112 prevents the integrally molded product including the second relay pulley 107 and the relay gear 109 from coming off the second support shaft 117.

The ejection output gear 110 is fixed to the rear end portion of the roller shaft 132b of the drive roller 132 for the pair of switchback pre-ejection rollers 32. An E ring 111 serving as a retaining member is fixed to the rear end portion of the roller shaft 132b of the drive roller 132 for the pair of switchback pre-ejection rollers 32. The E ring 111 prevents the ejection output gear 110 from coming off the roller shaft 130b.

The drive force of the sheet ejection motor 101 is transmitted from the motor gear 101a to the reduction gear 102, so that the drive roller 131 of the pair of pre-ejection rollers 31 is driven to rotate. The drive force of the sheet ejection motor 101 is transmitted to the first relay pulley 105 via the drive pulley 103 and the first timing belt 108 that are disposed coaxially with the reduction gear 102. The drive force transmitted to the first relay pulley 105 is transmitted to the ejection output pulley 106 via the second timing belt 116. Thus, the drive roller 130 for the pair of ejection rollers 30 is driven to rotate. The drive force of the sheet ejection motor 101 is transmitted to the ejection output gear 110 via the first timing belt 108, the second relay pulley 107, and the relay gear 109. Thus, the drive roller 132 for the pair of switchback pre-ejection rollers 32 is driven to rotate.

The first timing belt 108 is applied with three load torques of the pair of ejection rollers 30, the pair of pre-ejection rollers 31, and the pair of switchback pre-ejection rollers 32. On the other hand, only the load torque of the pair of ejection rollers 30 is applied to the second timing belt 116. As described above, since the first timing belt 108 is applied with a larger load torque than the second timing belt 116, the belt width of the first timing belt 108 is set to be larger than the belt width of the second timing belt 116. In addition, setting the belt width of the second timing belt 116 narrower than the belt width of the first timing belt 108 can restrain an increase in the total axial length of the sheet-ejection drive device 100.

Figure 4A:
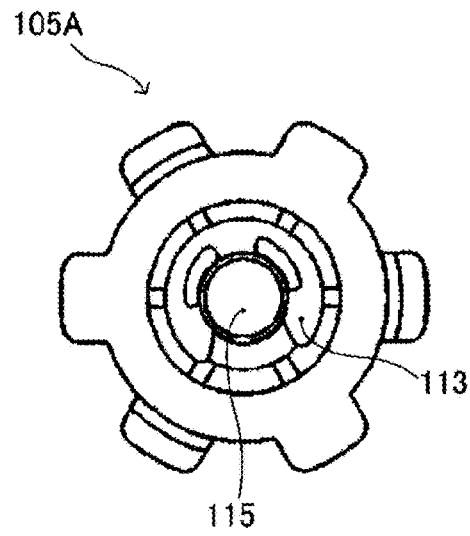
FIGS. 4A and 4B are schematic configuration diagrams of a first relay pulley according to a comparative example.
Figure 4B:
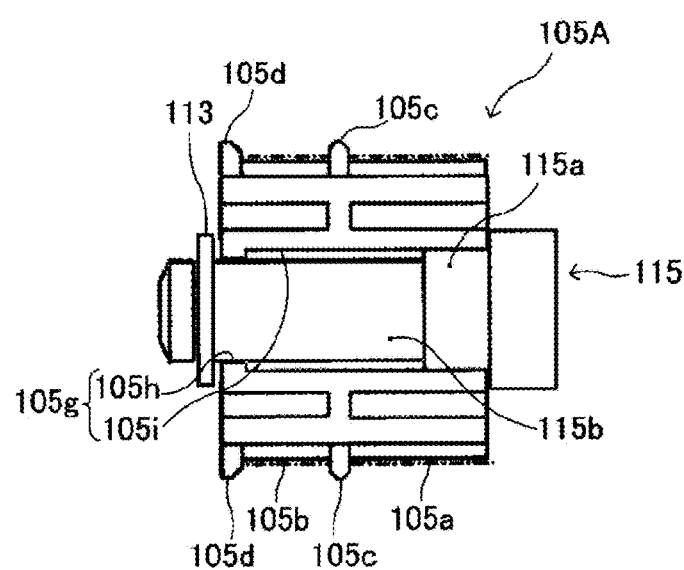

FIGS. 4A and 4B are schematic configuration diagrams of a first relay pulley 105A according to a comparative example. As illustrated in FIGS. 4A and 4B, the first relay pulley 105A includes a first deviation preventing projection 105c between an input pulley portion 105a and an output pulley portion 105b. The first deviation preventing projection 105c stops the deviation of the first timing belt 108. Further, the first relay pulley 105A includes a second deviation preventing projection 105d at a rear end portion that is at one side in the axial direction. The second deviation preventing projection 105d stops deviation of the second timing belt 116. The first timing belt 108 having a belt width wider than a belt width of the second timing belt 116 is wound around the input pulley portion 105a. Therefore, the input pulley portion 105a is set to be longer than the output pulley portion 105b in the axial direction.

The first relay pulley 105A includes the input pulley portion 105a and the output pulley portion 105b having different axial lengths from each other. The first relay pulley 105A further includes the first deviation preventing projection 105c between the input pulley portion 105a and the output pulley portion 105b. Accordingly, when the first relay pulley 105A is assembled to the first support shaft 115 by reverse attachment, the first timing belt 108 and the second timing belt 116 cannot be wound around the first relay pulley 105A. Note that the reverse attachment is an attachment which the first relay pulley 105A is assembled in reverse to a normal attachment in which the output pulley portion 105b is positioned on the front side.

Therefore, in the comparative example, the reverse attachment of the first relay pulley 105A is prevented by a configuration as illustrated in FIG. 4B. For example, a first support shaft 115 is provided with a first small-diameter portion 115a and a second small-diameter portion 115b. A first inner peripheral surface 105h and a second inner peripheral surface 105i are provided on a shaft insertion portion 105g of the first relay pulley 105A. The first inner peripheral surface 105h is in contact with the outer peripheral surface of the first small-diameter portion 115a. The second inner peripheral surface 105i is in contact with the outer peripheral surface of the second small-diameter portion 115b. With such a configuration, when the first relay pulley 105A is inserted in reverse to the first support shaft 115, a downstream end portion of the second inner peripheral surface 105i in the insertion direction abuts against a downstream end portion of the first small-diameter portion 115a in the insertion direction. Thus, the first relay pulley 105A cannot be assembled to the first support shaft 115, and reverse attachment can be prevented.

In the first relay pulley 105A of the comparative example illustrated in FIG. 4, when the drive force of the sheet ejection motor 101 is transmitted to the first relay pulley 105A and the first relay pulley 105A is driven to rotate, the first inner peripheral surface 105h and the second inner peripheral surface 105i slide on the first support shaft 115. The first relay pulley 105A is made of resin, and wear may occur depending on usage conditions. Therefore, the amount of wear of the first inner peripheral surface 105h and the second inner peripheral surface 105i due to sliding with the first support shaft 115 increases, depending on usage conditions such as a load applied to the first relay pulley 105A. Accordingly, the product life of the first relay pulley 105A might come to an end early. Further, a load due to sliding resistance between the first support shaft 115 and the first relay pulley 105A is applied to the first timing belt 108 and the like. Accordingly, the product life of a drive transmission member such as the first timing belt 108 of the sheet-ejection drive device 100 may be shortened.

Figure 5A:
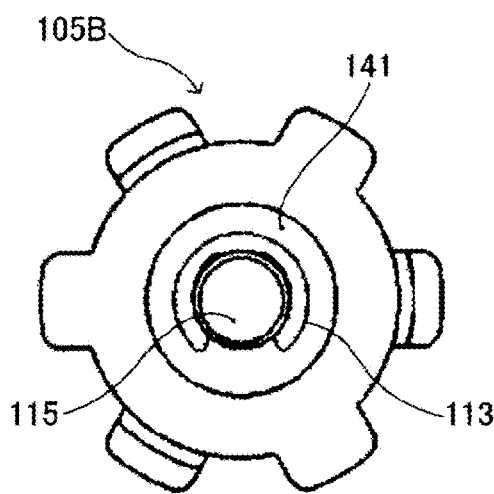
FIGS. 5A and 5B are diagrams of a first relay pulley according to another comparative example.
Figure 5B:
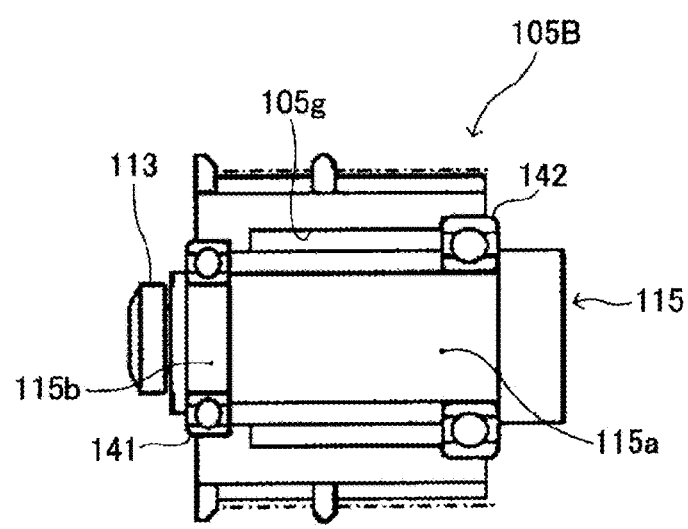

FIGS. 5A and 5B are illustrations of another comparative example in which the first relay pulley 105A of the comparative example illustrated in FIGS. 4A and 4B is modified. In order to improve a disadvantage of the configuration illustrated in FIGS. 4A and 4B, another comparative example illustrated in FIGS. 5A and 5B has the following configuration. For example, a first ball bearing 141 as a bearing is press-fitted into a rear end portion (left side in FIG. 5B) of a shaft insertion portion 105g of a first relay pulley 105B, and a second ball bearing 142 as a bearing is press-fitted into a front end portion (right side in FIG. 5B) of the shaft insertion portion 105g of the first relay pulley 105B. The first ball bearing 141 is smaller in size than the second ball bearing 142 and has an inner diameter smaller than the inner diameter of the second ball bearing 142. As described above, the inner diameter of the first ball bearing 141 is set to be smaller than the inner diameter of the second ball bearing 142. With such a configuration, when the first relay pulley 105B is attempted to be assembled in reverse to the first support shaft 115, the first ball bearing 141 abuts against an end portion of a first small-diameter portion 115a. Thus, the first relay pulley 105B cannot be assembled to a first support shaft 115, and reverse attachment of the first relay pulley 105B can be prevented even in the comparative example of FIGS. 5A and 5B.

In the comparative example of FIGS. 5A and 5B, the first support shaft 115 as a shaft member rotatably supports the first relay pulley 105B as a counterpart member via ball bearings 141 and 142. Thus, the first relay pulley 105B is driven to rotate without sliding on the first support shaft 115. Accordingly, wear of the first relay pulley 105B is restrained, thus enhancing the durability of the first relay pulley 105B. Further, no sliding resistance is generated between the first relay pulley 105B and the first support shaft 115. Accordingly, as compared with the comparative example illustrated in FIGS. 4A and 4B, the load applied to the drive transmission member such as the first timing belt 108 of the sheet-ejection drive device 100 can be reduced.

Figure 6:
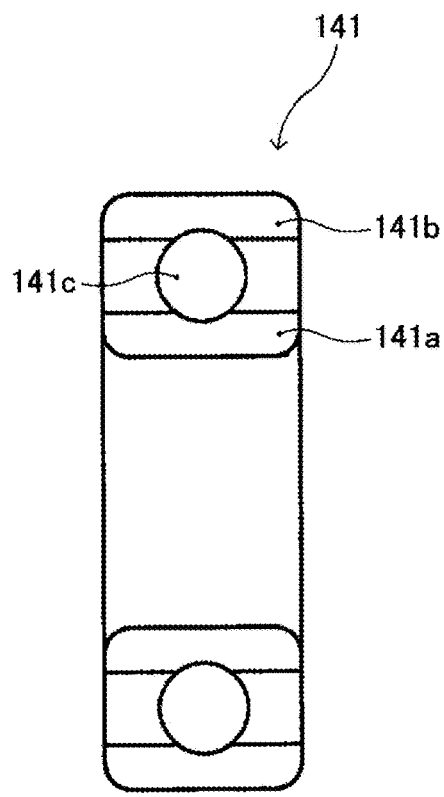
FIG. 6 is a schematic configuration diagram of a first ball bearing.

FIG. 6 is a schematic configuration diagram of the first ball bearing 141. As illustrated in FIG. 6, the first ball bearing 141 includes an inner ring 141a made of metal, an outer ring 141b made of metal, and a ball 141c as a rolling element disposed between the inner ring 141a and the outer ring 141b. The second ball bearing 142 has the same configuration as the first ball bearing 141.

The outer ring 141b of the first ball bearing 141 rotates together with the first relay pulley 105B. On the other hand, the inner ring 141a is in a stationary state together with the first support shaft 115 since the static friction force with the first support shaft 115 is greater than the friction force with the ball 141c.

Figure 7:
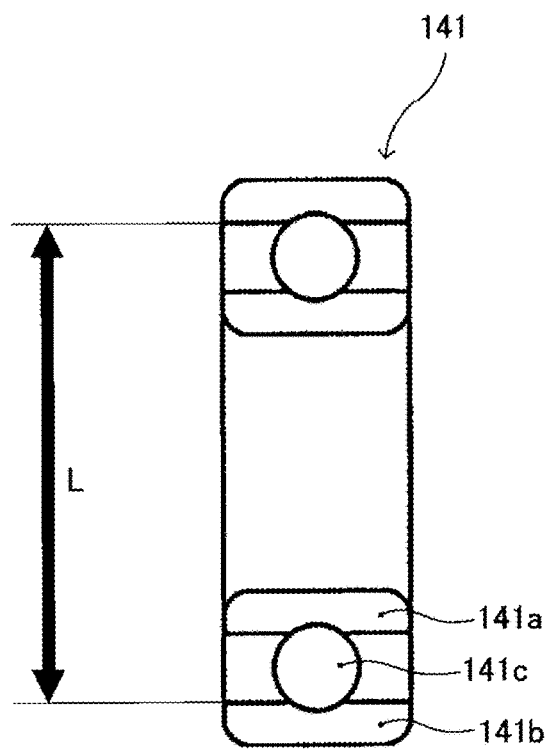
FIG. 7 is a diagram illustrating an inner diameter dimension of an outer ring of the first ball bearing.
Figure 8:
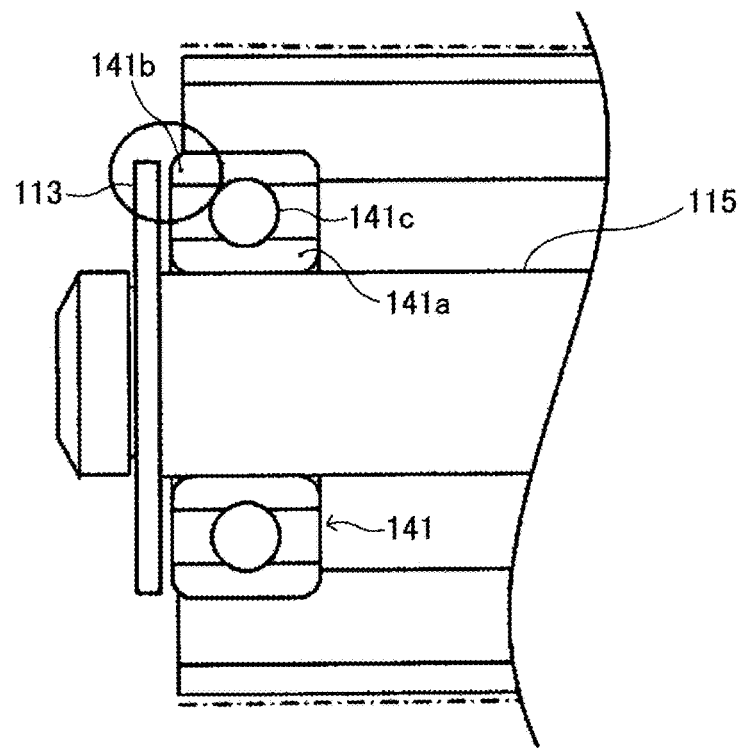
FIG. 8 is a diagram illustrating a configuration in which an E ring is in contact with an outer ring of the first ball bearing.

The E ring 113 as a retaining member attached to a distal end portion of the first support shaft 115 is preferably made of metal and is preferably in contact with only the inner ring 141a of the first ball bearing 141. Accordingly, as illustrated in FIG. 7, the outer diameter of the E ring 113 is preferably smaller than the inner diameter L of the outer ring 141b. The outer ring 141b rotates together with the first relay pulley 105, and the E ring 113 attached to the first support shaft 115 does not rotate. Accordingly, as illustrated in FIG. 8, when the E ring 113 is configured to contact the outer ring 141b, the E ring 113 slides on the outer ring 141b. Since the E ring 113 and the outer ring 141b are made of metals, the sliding of the E ring 113 on the outer ring 141b causes sliding between metals, which may cause abnormal noise. In addition, when metals having no slidability are used, seizure might occur and cause the metals to stick each other depending on usage conditions.

As described above, the first ball bearing 141 is a ball bearing having a smaller size than the second ball bearing 142 in order to prevent the first relay pulley 105B from being reversely attached. In order to prevent contact with the outer ring 141b of the first ball bearing 141 having a small size, the E ring 113 needs to have a size smaller than a general size.

As illustrated in FIG. 3, in the sheet-ejection drive device 100, not only the E ring 113 is attached to the first support shaft 115 but also the E ring 112 is attached to the second support shaft 117. In addition, the E ring 114 is attached to the roller shaft 130b of the drive roller 130 for the sheet pair of ejection rollers 30, and the E ring 111 is attached to the roller shaft 132b of the drive roller 132 for the pair of switchback pre-ejection rollers 32.

The E ring 111 attached to the roller shaft 132b of the drive roller 132 rotates together with the ejection output gear 110. Accordingly, even in a configuration in which the E ring 111 contacts the ejection output gear 110, the E ring 111 does not slide on the ejection output gear 110. Thus, the E ring 111 attached to the roller shaft 132b of the drive roller 132 for the pair of switchback pre-ejection rollers 32 is not particularly limited, and an inexpensive E ring of a general size can be used.

Similarly, the E ring 114 attached to the roller shaft 130b of the drive roller 130 for the pair of ejection rollers 30 rotates together with the ejection output pulley 106 and does not slide on the ejection output pulley 106. Accordingly, an E ring of a general size can be also used as the E ring 114 attached to the roller shaft 130b of the drive roller 130 for the sheet pair of ejection rollers 30.

The E ring 112 fixed to the second support shaft 117, which is fixed to the rear plate 1a, slides on the relay gear 109 facing the E ring 112 in the axial direction. However, the relay gear 109 is made of a resin having slidability such as polyoxymethylene (POM). Such a configuration can prevent occurrence of abnormal noise even if the E ring 112 slides on the relay gear 109. Thus, the E ring 112 attached to the second support shaft 117 is not particularly limited.

As described above, in the comparative example of FIGS. 5A and 5B, inexpensive E rings of a general size can be used as the three E rings 111, 112, and 114 among the four E rings 111, 112, 113, and 114 used in the sheet-ejection drive device 100. However, the E ring 113 fixed to the first support shaft 115 needs to be smaller than the other E rings 111, 112, and 114. As a result, it is necessary to manage two types of E rings of the E ring 113 fixed to the first support shaft 115 and the other E rings 111, 112, and 114. Such a configuration may lead to an increase in component management cost.

Further, in the comparative example of FIGS. 5A and 5B, erroneous assembly of the E rings such as fixing of another E ring 111, 112, or 114 to the first support shaft 115 might occur. In addition, it is necessary to check the size of an E ring and attach the E ring to the shaft so that erroneous assembly does not occur. As a result, assembly efficiency might be deteriorated.

In the comparative example of FIGS. 5A and 5B, it is also conceivable to set the other E rings 111, 112, and 114 to a small size, similarly to the E ring 113 fixed to the first support shaft 115. However, when the size is small, assemblability to the shaft might be deteriorated, which might deteriorate assembly efficiency.

The sheet-ejection drive device 100 according to the present embodiment is an improvement of the other comparative example of FIGS. 5A and 5B described above. For example, even when an E ring having the same general size as the other E rings 111, 112, and 114 is used as the E ring 113 fixed to the first support shaft 115, the E ring 113 does not come into contact with the outer ring of the first ball bearing 141. Hereinafter, the sheet-ejection drive device 100 according to the present embodiment is described in detail.

Figure 9A:
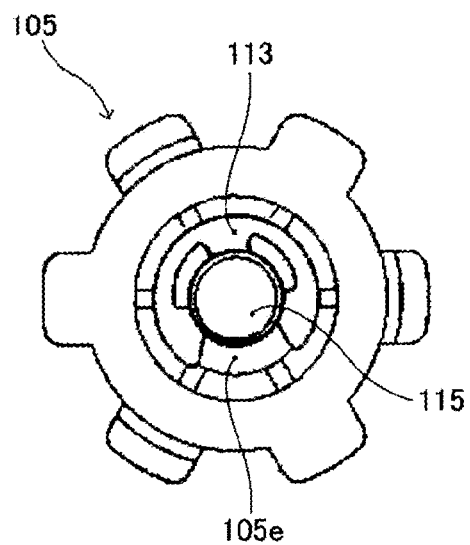
FIGS. 9A and 9B are schematic configuration diagrams illustrating the first relay pulley, a first support shaft, and the E ring in the embodiment.
Figure 9B:
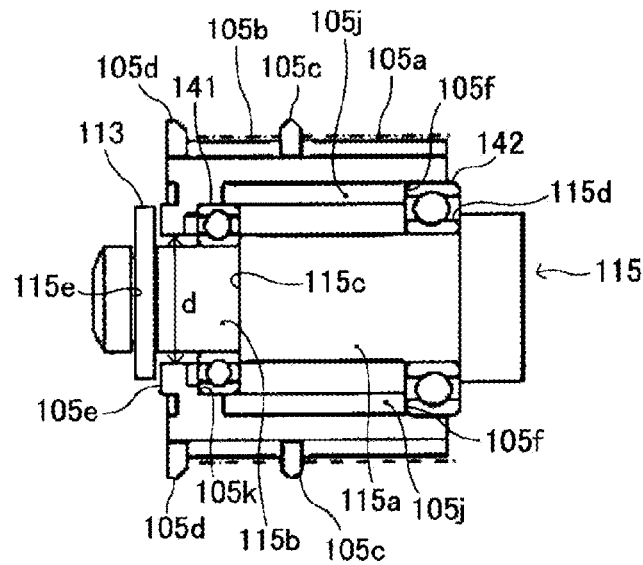
Figure 10:
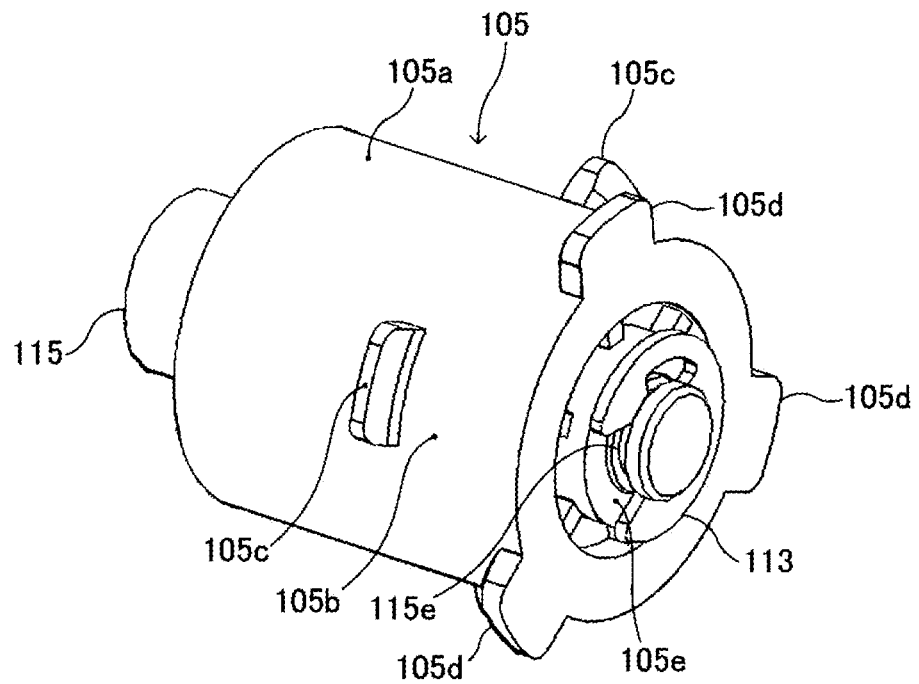
FIG. 10 is a perspective view illustrating the first relay pulley, the first support shaft, and the E ring of FIGS. 9A and 9B.

FIGS. 9A and 9B are schematic configuration diagrams illustrating the first relay pulley 105, the first support shaft 115, and the E ring 113 in the present embodiment. FIG. 10 is a perspective view illustrating the first relay pulley 105, the first support shaft 115, and the E ring 113 according to the present embodiment. In the following description, characteristic portions are mainly described, and redundant descriptions of the configuration similar to the configurations illustrated in FIGS. 4A and 4B and 5A and 5B are appropriately omitted.

The first relay pulley 105 of the present embodiment has an opposing portion 105e that extends further toward the rear side, which is one side in the axial direction, than the first ball bearing 141. The opposing portion 105e opposes the E ring 113 in the axial direction. In this way, the opposing portion 105e is provided in the first relay pulley 105, and the E ring 113 comes into contact with the opposing portion 105e and does not come into contact with the first ball bearing 141. The first relay pulley 105 is made of a resin having slidability such as POM. Thus, sliding of the E ring 113 with respect to the opposing portion 105e is sliding between metal and resin. Accordingly, unlike sliding between metals, generation of noise can be restrained.

Further, there is no restriction that the outer diameter of the E ring 113 is equal to or smaller than the inner diameter of the outer ring of the first ball bearing 141. Thus, in the sheet-ejection drive device 100, the E ring 113 fixed to the first support shaft 115 can be an inexpensive E ring of a general size having the same shape as the other E rings 111, 112, and 114. Such a configuration can prevent the occurrence of erroneous assembly that is a disadvantage in the comparative examples. Further, the component management cost can be reduced. Further, assembly efficiency can be improved.

As illustrated in FIG. 9B, the first relay pulley 105 of the present embodiment has guide ribs 105j, a first positioning portion 105k, and a second positioning portion 105f. As described later, the guide ribs 105j guide the first ball bearing 141. The guide ribs 105j are provided on the inner peripheral surface of the shaft insertion portion 105g of the first relay pulley 105. The first positioning portion 105k is to position the first ball bearing 141. The second positioning portion 105f is to position the second ball bearing 142. The second positioning portion 105f is a distal end surface orthogonal to the axial direction of the guide rib 105j.

A rear end portion (left end in FIG. 9B) of the outer ring of the second ball bearing 142 abuts against the second positioning portion 105f. Thus, the second ball bearing 142 is positioned in the front side of the first relay pulley 105. A front end portion (right end in FIG. 9B) of the inner ring of the second ball bearing 142 abuts against a second step surface 115d of the first support shaft 115. The second step surface 115d is a surface orthogonal to the axial direction, which is a step between the outer peripheral surface of the shaft and the second small-diameter portion 115b. Thus, the second ball bearing 142 is sandwiched between the second step surface 115d of the first support shaft 115 and the second positioning portion 105f of the first relay pulley 105 in the axial direction.

A rear end portion (left end in FIG. 9B) of the outer ring of the first ball bearing 141 abuts against the first positioning portion 105k of the first relay pulley 105. Thus, the first ball bearing 141 is positioned at the rear side of the first relay pulley 105. A front end portion (right end in FIG. 9B) of the inner ring of the first ball bearing 141 abuts against the first step surface 115c of the first support shaft 115. The first step surface 115c is a surface orthogonal to the axial direction, which is a step between the second small-diameter portion 115b and the first small-diameter portion 115a. Thus, the first ball bearing 141 is sandwiched between the first step surface 115c of the first support shaft 115 and the first positioning portion 105k of the first relay pulley 105 in the axial direction.

The first relay pulley 105 is made of resin and thus has a large coefficient of thermal expansion. Accordingly, the first relay pulley 105 greatly varies in the radial direction when the temperature rises. The first ball bearing 141 and the second ball bearing 142 are press-fitted into the first relay pulley 105. However, since the radial variation of the first relay pulley 105 is large when the temperature rises, the press-fitting force between the first relay pulley 105 and each of the first ball bearing 141 and the second ball bearing 142 may decrease due to thermal expansion of the first relay pulley 105. When the press-fitting force between the first relay pulley 105 and each of the first ball bearing 141 and the second ball bearing 142 decreases, the first ball bearing 141 and the second ball bearing 142 become relatively movable in the axial direction relative to the first support shaft 115 and the first relay pulley 105. In the present embodiment, as described above, each of the first ball bearing 141 and the second ball bearing 142 is assembled so as to be sandwiched between the first support shaft 115 and the first relay pulley 105 in the axial direction. Accordingly, even if the press-fitting force between the first relay pulley 105 and each of the first ball bearing 141 and the second ball bearing 142 decreases, the step surfaces 115c and 115d of the first support shaft 155 restrict the movement of each of the first ball bearing 141 and the second ball bearing 142 toward the fixed end portion of the first support shaft 115 with respect to the first relay pulley 105. Thus, each of the first ball bearing 141 and the second ball bearing 142 can be prevented from coming off the press-fitting portion of the first relay pulley 105. Further, each of the first ball bearing 141 and the second ball bearing 142 restricts the movement of the first relay pulley 105 toward the fixed end portion of the first support shaft 155, so that the first relay pulley 105 can be positioned at a predetermined position.

As illustrated in FIG. 9B, the inner diameter d of the opposing portion 105e of the first relay pulley 105 of the present embodiment is smaller than the outer diameter of the first ball bearing 141. Accordingly, the first ball bearing 141 cannot be inserted from the rear side (left side in FIG. 9B) of the first relay pulley 105. Therefore, the first ball bearing 141 is inserted from the front side (right side in FIG. 9B) of the first relay pulley 105.

Figure 11:
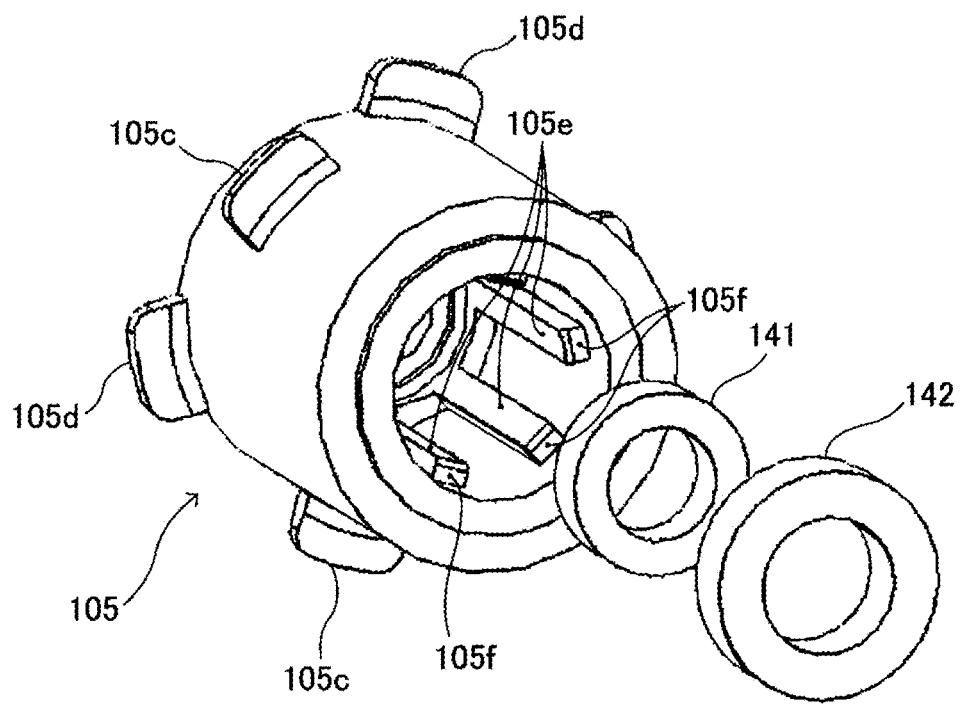
FIG. 11 is a perspective view illustrating assembly of the first ball bearing and a second ball bearing to the first relay pulley.
Figure 12:
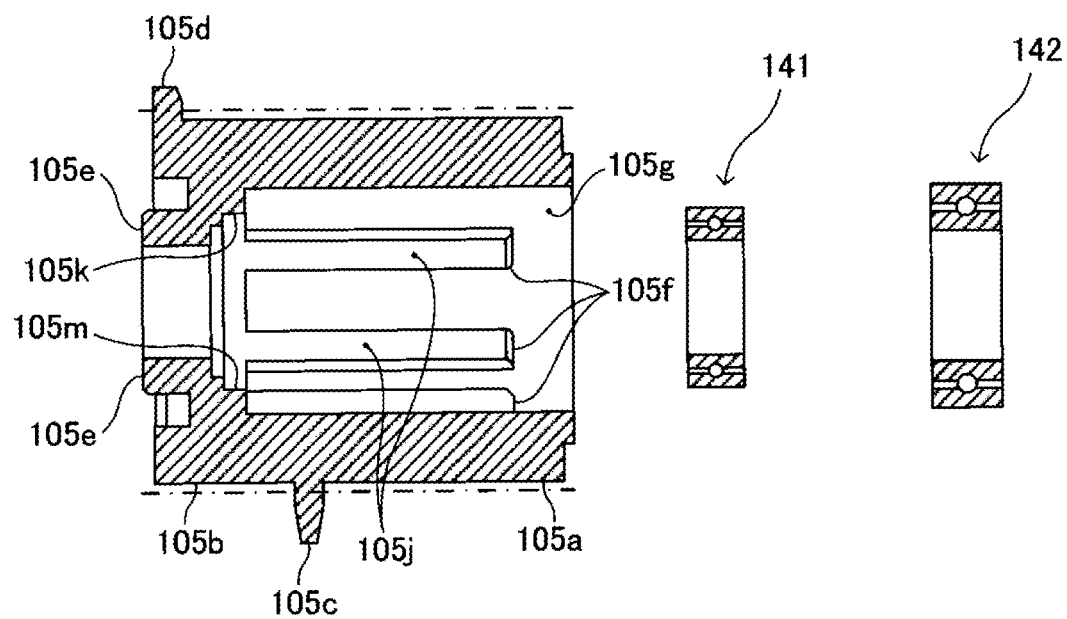
FIG. 12 is a cross-sectional view illustrating assembly of the first ball bearing and the second ball bearing to the first relay pulley.

FIG. 11 is a perspective view illustrating assembly of the first ball bearing 141 and the second ball bearing 142 to the first relay pulley 105. FIG. 12 is a cross-sectional view illustrating assembly of the first ball bearing 141 and the second ball bearing 142 to the first relay pulley 105.

As illustrated in FIGS. 11 and 12, a plurality of guide ribs 105j are provided on the inner peripheral surface of the shaft insertion portion 105g at predetermined intervals in the circumferential direction of the first relay pulley 105. The diameters of inscribed circles connecting the top portions of the guide ribs 105j are substantially the same as the outer diameter of the first ball bearing 141. The first ball bearing 141 is inserted into the shaft insertion portion 105g from the front side of the first relay pulley 105 so that the outer peripheral surface of the first ball bearing 141 contacts the top portions of the respective guide ribs 105j.

While the first ball bearing 141 inserted into the shaft insertion portion 105g is guided by the plurality of guide ribs 105j, the first ball bearing 141 is moved to the rear side until the outer ring abuts against the first positioning portions 105k. Accordingly, the first ball bearing 141 is press-fitted into a first press-fitting portion 105m of the first relay pulley 105, which is one step shorter than the inner peripheral surface of the shaft insertion portion 105g. Thus, the first ball bearing 141 is assembled to the first relay pulley 105. In this way, the first ball bearing 141 is assembled while being guided by the plurality of guide ribs 105j. Thus, the first ball bearing 141 can be easily assembled to the first relay pulley 105 without causing a failure such as tilting of the first ball bearing 141 relative to the axial direction during assembly.

When the assembly of the first ball bearing 141 is completed, the second ball bearing 142 is press-fitted into the shaft insertion portion 105g from the front side of the first relay pulley 105 and abuts against the second positioning portion 105f at the distal end of the guide rib 105j. Thus, the second ball bearing 142 is assembled to the first relay pulley 105.

Figure 13:
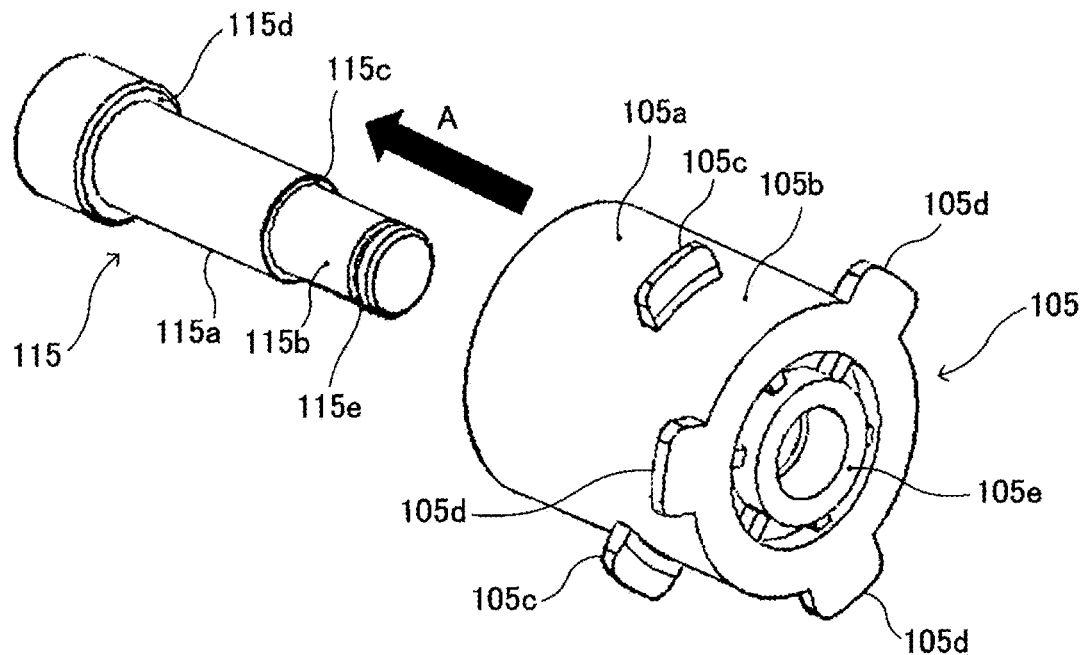
FIG. 13 is a perspective view illustrating assembly of the first relay pulley, to which the first ball bearing and the second ball bearing are assembled, to the first support shaft.

FIG. 13 is a perspective view illustrating assembly of the first relay pulley 105, to which the first ball bearing 141 and the second ball bearing 142 have been assembled, to the first support shaft 115. The first relay pulley 105 is moved in a direction indicated by arrow A in FIG. 13, and the distal end of the first support shaft 115 fixed to the rear plate 1a by caulking or the like is inserted into the shaft insertion portion 105g from the front side of the first relay pulley 105. Then, the distal end of the first support shaft 115 passes through the first relay pulley 105. The inner ring of the first ball bearing 141 abuts against the first step surface 115c of the first support shaft 115. The inner ring of the second ball bearing 142 abuts against the second step surface 115d of the first support shaft 115. Thus, the first relay pulley 105 is assembled to the first support shaft 115. After the first relay pulley 105 is assembled, the E ring 113 is fitted into a groove portion 115e of the first support shaft 115.

As described above, when the first relay pulley 105 is assembled to the first support shaft 115, the inner ring of the first ball bearing 141 abuts against the first step surface 115c of the first support shaft 115, and the first ball bearing 141 is pushed rearward by the first step surface 115c. Accordingly, even when the outer ring of the first ball bearing 141 is not in contact with the first positioning portion 105k and is not correctly assembled, the outer ring of the first ball bearing 141 can be pushed by the first step surface 115c and brought into contact with the first positioning portion 105k. Thus, the first ball bearing 141 can be correctly assembled to the first relay pulley 105.

Similarly, even when the outer ring of the second ball bearing 142 is not in contact with the second positioning portion 105f and is not correctly assembled, the outer ring of the second ball bearing 142 can be pushed by the second step surface 115d and brought into contact with the second positioning portion 105f. Thus, the second ball bearing 142 can be correctly assembled to the first relay pulley 105.

In addition, the first relay pulley 105 of the present embodiment has the opposing portion 105e on the rear side. The opening on the rear side is clearly smaller than the opening on the front side. Thus, the front side and the rear side of the first relay pulley 105 can be easily visually determined, and the reverse attachment of the first relay pulley 105 is restrained. If the first relay pulley 105 is reversely attached to the first support shaft 115, the inner ring of the first ball bearing 141 abuts against the first step surface 115c of the first support shaft 115. Accordingly, the first relay pulley 105 cannot be inserted into the first support shaft 115 until the distal end of the first support shaft 115 passes through the first relay pulley 105. Thus, the first relay pulley 105 can be prevented from being reversely attached.

First Variation

Figure 14A:
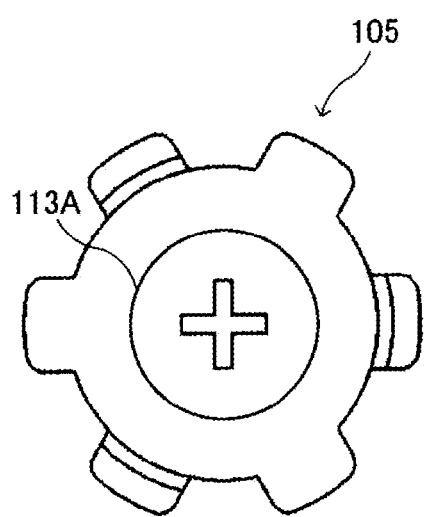
FIGS. 14A and 14B are schematic configuration diagrams of a first variation.
Figure 14B:
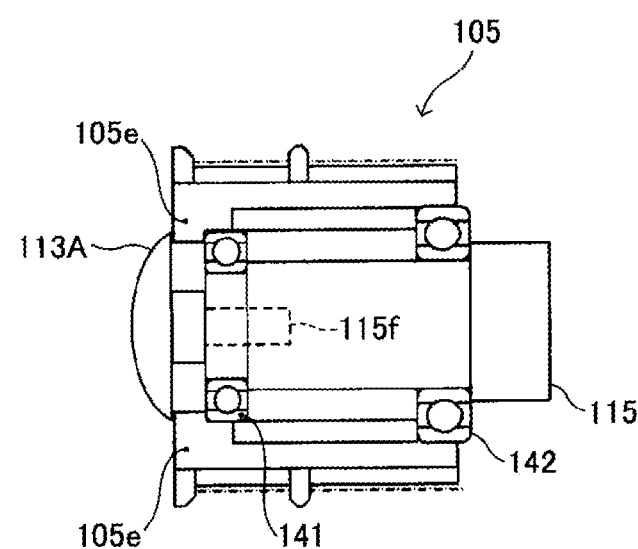
Figure 15:
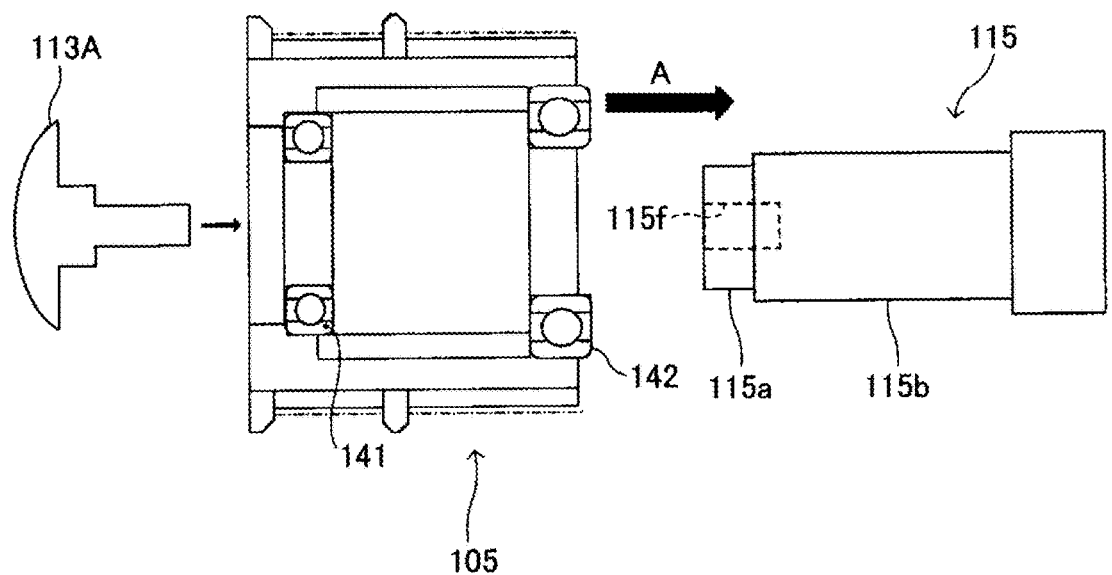
FIG. 15 is a diagram illustrating assembly of a first relay pulley according to the first variation.

FIGS. 14A and 14B are schematic configuration diagrams of a first variation of the first relay pulley 105. FIG. 15 is a diagram illustrating assembly of the first relay pulley 105 according to the first variation. In the first variation, a stepped screw 113A is used as a retaining member for the first relay pulley 105. In the first variation, a screw hole 115f in which a screw groove is formed on an inner peripheral surface is provided at a distal end of the first support shaft 115. As illustrated in FIG. 15, similarly to the above-described embodiment, the first relay pulley 105 into which the first ball bearing 141 and the second ball bearing 142 are press-fitted is moved in the direction indicated by arrow A in FIG. 15. Thus, the first relay pulley 105 is assembled to the first support shaft 115. Next, the stepped screw 113A is fastened to the screw hole 115f of the first support shaft 115. Thus, as illustrated in FIGS. 14A and 14B, the head of the stepped screw 113A faces the opposing portion 105e of the first relay pulley 105. Accordingly, the stepped screw 113A can stop the first relay pulley 105 from coming off the first support shaft 115.

Since the stepped screw 113A is made of metal, abnormal noise may be generated when the head of the stepped screw 113A slides on the outer ring of the first ball bearing 141. However, also in the first variation, since the first relay pulley 105 is provided with the opposing portion 105e, the head of the stepped screw 113A slides on the opposing portion 105e made of a resin material having slidability. Such a configuration can restrain the generation of abnormal noise.

Second Variation

Figure 16:
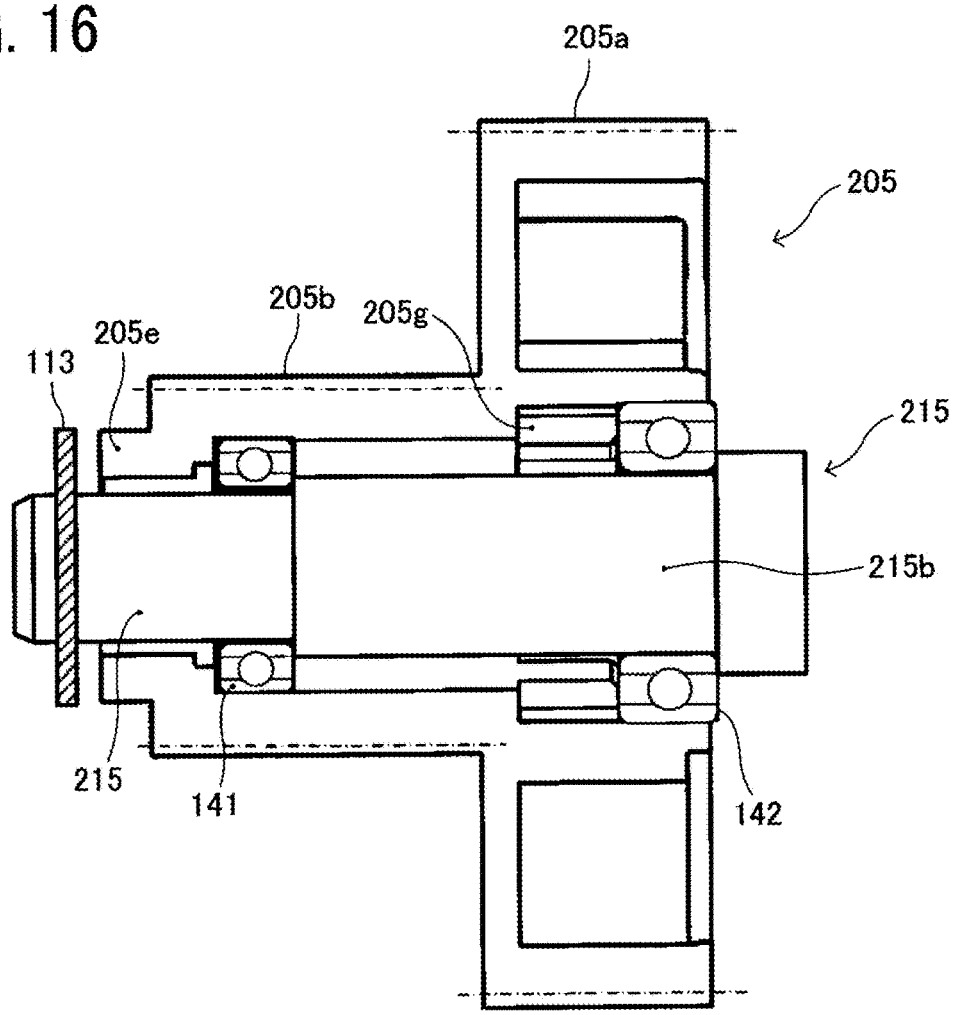
FIG. 16 is a schematic configuration diagram of a second variation.

FIG. 16 is a schematic configuration diagram of a second variation. The second variation is an example in which a two-stage gear 205 is employed in the above-described embodiment. The two-stage gear 205 as a counterpart member is made of a resin material having slidability such as POM and includes a large-diameter gear portion 205a and a small-diameter gear portion 205b. Other configurations are similar to the configurations of the above-described embodiment. Specifically, the first ball bearing 141 and the E ring 113 are configured not to come into contact with each other, and the two-stage gear 205 is configured to be prevented from being reversely attached.

The reverse attachment of the two-stage gear 205 is prevented by the following configuration. For example, the first ball bearing 141 is press-fitted to one side (left side in FIG. 16) in the axial direction of the shaft insertion portion 205g of the through-hole shape of the two-stage gear 205. The second ball bearing 142 having a larger size than the first ball bearing 141 is press-fitted to the other side (right side in FIG. 16). A support shaft 215 that supports the two-stage gear 205 via the first ball bearing 141 and the second ball bearing 142 includes a first small-diameter portion 215a and a second small-diameter portion 215b that is larger than the first small-diameter portion 215a from the distal end side of the support shaft 215.

The configuration in which the first ball bearing 141 and the E ring 113 are not in contact with each other is a configuration in which the two-stage gear 205 extends further toward the one side in the axial direction beyond the first ball bearing 141 and includes the opposing portion 205e facing the E ring 113 in the axial direction. With such a configuration, also in the second variation, abnormal noise can be prevented from being generated when the two-stage gear 205 is driven to rotate.

Third Variation

Figure 17:
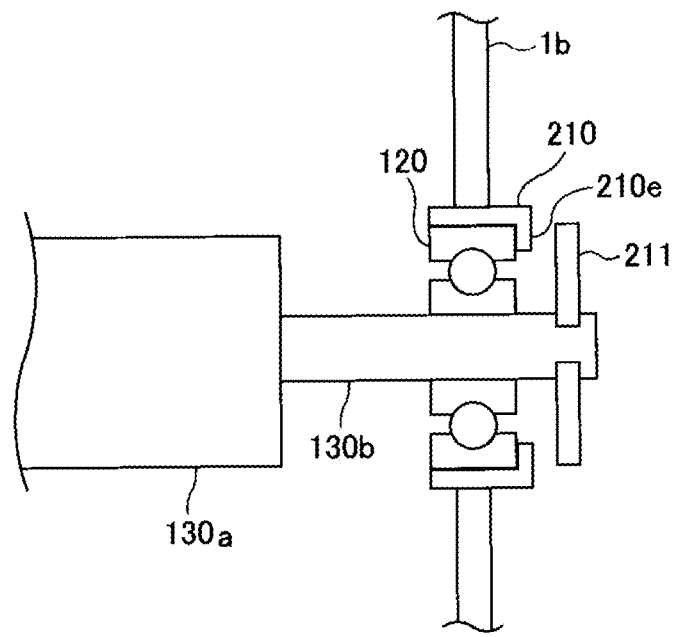
FIG. 17 is a schematic configuration diagram of a third variation.

FIG. 17 is a schematic configuration diagram of a third variation. The third variation is an example of a configuration in which the shaft member rotates and the counterpart member does not rotate. In the third variation, a bearing case 210 made of a resin material as the counterpart member is attached to the side plate 1b of the image forming apparatus 1000. A ball bearing 120 is disposed between the bearing case 210 and the roller shaft 130b of the drive roller to rotatably support the roller shaft 130b. An E ring 211 is fixed to one end of the roller shaft 130b as a retaining member to prevent the roller shaft 130b from coming off from the side plate 1b. The bearing case 210 includes an opposing portion 210e that extends further toward one side in the axial direction beyond the ball bearing 120 and that opposes the E ring 113 in the axial direction.

In the third variation, the E ring 211 rotates together with the roller shaft 130b. However, the outer ring of the ball bearing 120 is in a stationary state since the static friction force with the bearing case 210 is larger than the friction force with the balls. Accordingly, when the E ring 211 comes into contact with the outer ring of the ball bearing 120, the E ring 211 slides on the outer ring. As a result, abnormal noise might be generated due to sliding between metals. However, in the third variation as well, providing the opposing portion 210e in the bearing case 210 made of resin, the E ring 211 slides on the opposing portion 210e made of resin. Thus, sliding between the resin and the metal occurs, and generation of noise can be restrained.

Fourth Variation

Figure 18:
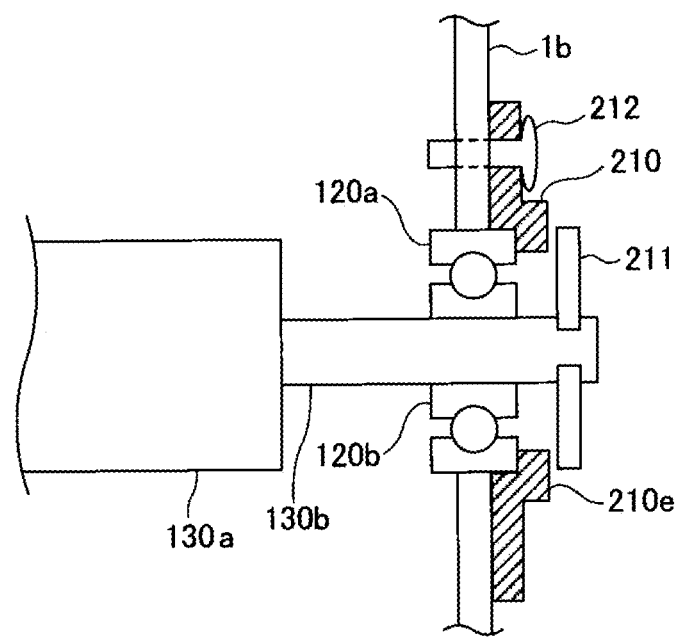
FIG. 18 is a schematic configuration diagram of a fourth variation.

FIG. 18 is a schematic configuration diagram of a fourth variation. The fourth variation differs from the third variation illustrated in FIG. 17 in the configuration of attachment of the ball bearing 120 and the bearing case 210 to the side plate 1b. In the third variation, as illustrated in FIG. 17, the bearing case 210 made of resin is attached to the side plate 1b of the image forming apparatus 1000. The ball bearing 120 is disposed between the bearing case 210 and the roller shaft 130b of the drive roller. The bearing case 210 rotatably supports the roller shaft 130b. However, in the configuration in which the outer ring of the ball bearing 120 made of metal is directly supported by the bearing case 210 made of resin, it is difficult to obtain positional accuracy of the roller shaft 130b. Accordingly, it is difficult to adopt the configuration of the third variation in a cane in which the rotation accuracy of the roller portion 130a is required.

Hence, in the fourth variation, as illustrated in FIG. 18, the outer ring of the ball bearing 120 is directly supported by the side plate 1b made of metal. The bearing case 210 made of resin is fixed to the side plate 1b by fastening members 212 such as screws. Such a configuration enhances the positional accuracy of the ball bearing 120. Accordingly, the positional accuracy of the roller shaft 130b can be enhanced, and the rotational accuracy of the roller portion 130a can be enhanced. Thus, in a case in which the rotation accuracy of the roller portion 130a is required, adopting the configuration of the fourth variation can satisfy the requirement of the rotation accuracy of the roller portion 130a and restrain the generation of abnormal noise.

In the third variation and the fourth variation, the bearing case 210 made of resin is provided, and the opposing portion 210e facing the E ring 211 is provided in the bearing case 210. However, in the case in which the side plate 1b is made of resin, the ball bearing 120 may be press-fitted into the side plate 1b, and the opposing portion facing the E ring 211 may be provided in the side plate 1b. In such a case, the bearing case 210 can be obviated.

The embodiments and variations described above are some examples and, for example, attain advantages described below in a plurality of aspects A to P.

Aspect 1

A rotating device, such as the sheet-ejection drive device 100, includes a shaft member, such as the first support shaft 115; a counterpart member, such as the first relay pulley 105, including a shaft insertion portion, such as the shaft insertion portion 105g, into which the shaft member is inserted; a bearing, such as the first ball bearing 141 and the second ball bearing 142, provided in the shaft insertion portion and interposed between the counterpart member and the shaft member to cause the counterpart member and the shaft member to be rotatable relative to each other; and a retaining member, such as the E ring 113, fixed to an end portion of the shaft member on one side in an axial direction of the shaft member. The counterpart member includes an opposing portion, such as the opposing portion 105e, disposed closer to the end portion of the shaft member on the one side in the axial direction than the bearing. The opposing portion faces the retaining member in the axial direction.

In a comparative example, an E ring serving as a retaining member is in contact with an end portion of a ball bearing, serving as a bearing, on one side in an axial direction of the ball bearing. The ball bearing includes an inner ring, an outer ring, and balls as rolling elements disposed between the inner ring and the outer ring. Typically, the outer ring and the inner ring are made of metal. The E ring is also typically made of metal. Accordingly, in the configuration in which the E ring is in contact with the end portion of the bearing on the one side in the axial direction of the bearing, the metals contact each other. The E ring rotates together with a paddle shaft relative to a bearing case. If the E ring is in contact with the outer ring of the ball bearing, the metals slide on each other, which might cause abnormal noise.

On the other hand, in Aspect 1, the opposing portion provided on the counterpart member facing the retaining member in the axial direction is positioned closer to the end portion of the shaft member on the one side in the axial direction of the shaft member than the bearing. Such a configuration allows the retaining member to be in contact with the opposing portion while preventing the retaining member from being in contact with the bearing. Such a configuration can prevent generation of abnormal noise due to sliding of the retaining member on the bearing.

Aspect 2

In Aspect 1, the shaft member, such as the first support shaft 115, is received by a plurality of bearings, such as the plurality of ball bearings 141 and 142, having different outer diameters. One bearing disposed on the one side in the axial direction has the smallest outer diameter among the plurality of bearings. According to such a configuration, as described in the above-described embodiment, the bearing disposed on the one side in the axial direction has the shortest outer diameter among the plurality of bearings. Accordingly, the inner diameter of the outer ring of the bearing is shorter than the outer diameter of the retaining member such as the E ring. In such a configuration, providing the opposing portion such as the opposing portion 105e in the counterpart member can prevent the retaining member from sliding on the outer ring of the bearing, without using a small-sized retaining member such as an E ring.

Aspect 3

In Aspect 2, the inner diameter of the opposing portion, such as the opposing portion 105e, is smaller than the outer diameter of the bearing, such as the first ball bearing 141, disposed on the one side in the axial direction. The inner peripheral surface of the shaft insertion portion, such as the shaft insertion portion 105g, has a guide rib, such as the guide rib 105j, to guide the bearing disposed on the one side in the axial direction. According to such a configuration, as described in the above-described embodiment, the inner diameter of the opposing portion, such as the opposing portion 105e, is smaller than the outer diameter of the bearing, such as the first ball bearing 141, disposed on the one side in the axial direction. Accordingly, the bearing disposed on the one side in the axial direction is inserted from the other side of the shaft insertion portion in the axial direction and positioned on the one side of the shaft insertion portion in the axial direction. In Aspect 3, the guide rib, such as the guide rib 105j, is provided on the inner peripheral surface of the shaft insertion portion, such as the shaft insertion portion the 105g. Such a configuration can easily move the bearing, which is to be disposed on the one side of the shaft insertion portion in the axial direction inserted from the other side of the shaft insertion portion in the axial direction, to the one side in the axial direction. Thus, the workability of assembling the bearing can be enhanced.

Aspect 4

In any one of Aspects 1 to 3, the end portion of the shaft member, such as the first support shaft 115, on the one side in the axial direction is a small-diameter portion, such as the first small-diameter portion 115a, having a smaller diameter than another portion of the shaft member. The bearings, such as the first ball bearing 141 and the second ball bearing 142, having different inner diameters are press-fitted into one side and the other side of the shaft insertion portion, such as the shaft insertion portion 105g, in the axial direction. The bearings are disposed in the small-diameter portion and a portion having a larger diameter than the small-diameter portion of the shaft member. As described in the above-described embodiment, such a configuration can prevent the counterpart member, such as the first relay pulley 105, from being reversely attached to the shaft member such as the first support shaft 115.

Aspect 5

In any one of Aspects 1 to 4, one end of the bearing, such as a ball bearing, abuts against a surface of the shaft member such as the first support shaft 115 (e.g., the first step surface 115c and the second step surface 115d in the above-described embodiment) that faces the bearing in the axial direction of the shaft member. The other end of the bearing abuts against a surface of the counterpart member such as the first relay pulley 105 (e.g., the first positioning portion 105k and the second positioning portion 105f in the above-described embodiment) that faces the bearing in the axial direction. According to such a configuration, as described in the above-described embodiment, the bearing can be prevented from moving relative to the counterpart member, such as the first relay pulley 105, in the axial direction. The bearing can be prevented from coming off the counterpart member.

Aspect 6

In any one of Aspects 1 to 5, the counterpart member, such as the first relay pulley 105, is not in contact with the shaft member such as the first support shaft 115. Such a configuration can restrain a decrease in contact pressure between the bearing and the counterpart member.

Aspect 7

In any one of Aspects 1 to 6, the counterpart member is a drive transmission member such as the first relay pulley 105. The shaft member is a support shaft such as the first support shaft 115 that supports the drive transmission member. As described in the above-described embodiment, such a configuration can restrain generation of abnormal noise during drive transmission.

Aspect 8

In any one of Aspects 1 to 7, the counterpart member such as the first relay pulley 105 is made of a resin material, and the bearing is a ball bearing. Such a configuration can prevent the retaining member, such as the E ring 113, from sliding on the outer ring of the ball bearing that rotates relative to the retaining member. Further, the resin material serves as a sliding counterpart of the retaining member, and generation of abnormal noise can be restrained.

Aspect 9

An image forming apparatus includes the rotating device according to any one of Aspects 1 to 8 and forms an image on a sheet. Such a configuration can restrain generation of abnormal noise.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:
1. A rotating device, comprising:
   a shaft member;
   a counterpart member including a shaft insertion portion into which the shaft member is inserted;
   a first bearing in the shaft insertion portion, the first bearing interposed between the counterpart member and the shaft member, the first bearing configured to cause the counterpart member and the shaft member to be rotatable relative to each other;

a retaining member on an end portion of the shaft member on one side in an axial direction of the shaft member, the counterpart member including an opposing portion closer to the end portion of the shaft member on the one side in the axial direction than the first bearing, and the opposing portion facing the retaining member in the axial direction; and the retaining member is configured to contact the opposing portion.

2. The rotating device according to claim 1, further comprising:

a plurality of bearings, including the first bearing, interposed between the counterpart member and the shaft member, the plurality of bearings having different outer diameters, wherein one bearing of the plurality of bearings disposed on the one side in the axial direction of the shaft member has a smallest outer diameter among the plurality of bearings.

3. The rotating device according to claim 2, wherein an inner diameter of the opposing portion is smaller than the outer diameter of the one bearing on the one side in the axial direction of the shaft member; and an inner peripheral surface of the shaft insertion portion has a guide rib configured to guide the one bearing.

4. The rotating device according to claim 1, further comprising:

a plurality of bearings, the plurality of bearings including the first bearing and a second bearing;

one end of the first bearing abuts against a surface of the shaft member that faces the second bearing of the plurality of bearings in the axial direction of the shaft member; and another end of the first bearing abuts against a surface of the counterpart member that faces the second bearing in the axial direction.

5. The rotating device according to claim 1, wherein the counterpart member is not in contact with the shaft member.

6. The rotating device according to claim 1, wherein the counterpart member is a drive transmission member; and the shaft member is a support shaft configured to support the drive transmission member.

7. The rotating device according to claim 1, wherein the counterpart member is made of resin; and the first bearing is a ball bearing.

8. An image forming apparatus comprising:

the rotating device according to claim 1; and an image forming device configured to form an image on a sheet.

9. A rotating device, comprising:

a shaft member;

a counterpart member including a shaft insertion portion into which the shaft member is inserted;

a first bearing in the shaft insertion portion, the first bearing interposed between the counterpart member and the shaft member, the first bearing configured to cause the counterpart member and the shaft member to be rotatable relative to each other;

a retaining member on an end portion of the shaft member on one side in an axial direction of the shaft member, the counterpart member including an opposing portion closer to the end portion of the shaft member on the one side in the axial direction than the first bearing, and the opposing portion facing the retaining member in the axial direction; and a second bearing having a different inner diameter than the first bearing, wherein the first and second bearings are press-fitted to the one side and another side of the shaft insertion portion in the axial direction, wherein the end portion of the shaft member on the one side in the axial direction of the shaft member is a small diameter portion having a smaller diameter than another portion of the shaft member, and wherein the first and second bearings are in the small diameter portion and a portion having a larger diameter than the small diameter portion of the shaft member.

10. The rotating device according to claim 9, wherein one end of the first bearing abuts against a surface of the shaft member that faces the second bearing in the axial direction of the shaft member; and another end of the first bearing abuts against a surface of the counterpart member that faces the second bearing in the axial direction.

11. The rotating device according to claim 9, wherein the counterpart member is not in contact with the shaft member.

12. The rotating device according to claim 9, wherein the counterpart member is a drive transmission member; and the shaft member is a support shaft configured to support the drive transmission member.

13. The rotating device according to claim 9, wherein the counterpart member is made of resin; and the first bearing is a ball bearing.

14. The rotating device according to claim 9, wherein an inner peripheral surface of the shaft insertion portion has a guide rib configured to guide the second bearing.

15. An image forming apparatus comprising:

an image forming device configured to form an image on a sheet; and a rotating device, the rotating device including, a shaft member;

a counterpart member including a shaft insertion portion into which the shaft member is inserted;

a first bearing in the shaft insertion portion, the first bearing interposed between the counterpart member and the shaft member, the first bearing configured to cause the counterpart member and the shaft member to be rotatable relative to each other;

a retaining member on an end portion of the shaft member on one side in an axial direction of the shaft member, the counterpart member including an opposing portion closer to the end portion of the shaft member on the one side in the axial direction than the first bearing, and the opposing portion facing the retaining member in the axial direction; and a second bearing having a different inner diameter than the first bearing, wherein the first and second bearings are press-fitted to the one side and another side of the shaft insertion portion in the axial direction, wherein the end portion of the shaft member on the one side in the axial direction of the shaft member is a small diameter portion having a smaller diameter than another portion of the shaft member, and wherein the first and second bearings are in the small diameter portion and a portion having a larger diameter than the small diameter portion of the shaft member.

16. The image forming apparatus according to claim 15, wherein one end of the first bearing abuts against a surface of the shaft member that faces the second bearing in the axial direction of the shaft member; and another end of the first bearing abuts against a surface of the counterpart member that faces the second bearing in the axial direction.

17. The image forming apparatus according to claim 15, wherein the counterpart member is not in contact with the shaft member.

18. The image forming apparatus according to claim 15, wherein the counterpart member is a drive transmission member; and the shaft member is a support shaft configured to support the drive transmission member.

19. The image forming apparatus according to claim 15, wherein the counterpart member is made of resin; and the first bearing is a ball bearing.

20. The image forming apparatus according to claim 15, wherein an inner peripheral surface of the shaft insertion portion has a guide rib configured to guide the second bearing.

* * * * *